United States Patent
Eckhardt et al.

(10) Patent No.: US 6,305,129 B1
(45) Date of Patent: Oct. 23, 2001

(54) DOOR TRIMMING PANEL HAVING A WINDOW-LIFT MECHANISM

(75) Inventors: Bernhard Yves Eckhardt, Wetzlar (DE); Frank Velthaus, Saint Pere sur Loire (FR)

(73) Assignee: Meritor Light Vehicle Systems, Sully sur Loire (FR)

( * ) Notice: Subject to any disclaimer, the term of this patent is extended or adjusted under 35 U.S.C. 154(b) by 0 days.

(21) Appl. No.: 09/684,234

(22) Filed: Oct. 6, 2000

(30) Foreign Application Priority Data

Oct. 7, 1999 (FR) .................................................. 99 12519

(51) Int. Cl.[7] .................................. B60J 1/08; B60J 5/04
(52) U.S. Cl. ............................ 49/502; 49/352; 296/146.7
(58) Field of Search ............................ 49/349, 352, 502; 296/146.1, 146.2, 146.7

(56) References Cited

U.S. PATENT DOCUMENTS

| 3,890,743 | * | 6/1975 | Eckhardt et al. ........................ 49/352 |
| 4,471,251 | * | 9/1984 | Yamahita ................................ 310/89 |
| 4,970,911 | * | 11/1990 | Ujihara et al. ................... 74/501.5 R |
| 5,040,430 | * | 8/1991 | Adam et al. ............................. 74/425 |
| 5,095,766 | * | 3/1992 | Knappe et al. ....................... 74/89.22 |
| 5,367,827 | * | 11/1994 | Tajima et al. ........................... 49/352 |
| 5,511,443 | * | 4/1996 | Munekoff ............................... 74/505 |
| 5,606,827 | * | 3/1997 | Kanou et al. ........................... 49/352 |
| 5,749,174 | * | 5/1998 | Mariel ..................................... 49/352 |
| 5,884,961 | * | 3/1999 | Serizawa et al. ................... 296/146.7 |
| 5,890,321 | * | 4/1999 | Staser et al. ............................ 49/502 |
| 6,139,088 | * | 10/2000 | Okamoto et al. ................... 296/146.6 |
| 6,185,873 | * | 2/2001 | Saito ..................................... 49/502 |

FOREIGN PATENT DOCUMENTS

| 42 12 261 A1 | 10/1993 | (DE) . |
| 0 712 746 A1 | 5/1996 | (EP) . |
| WO 9403341 A1 | 2/1994 | (WO) . |

* cited by examiner

*Primary Examiner*—Stephen T. Gordon
*Assistant Examiner*—Paul Chenevert
(74) *Attorney, Agent, or Firm*—Skinner and Associates

(57) ABSTRACT

The invention relates to a vehicle door comprising an outer panel lined with an inner door panel having at least one opening therethrough, a rigid base door trim panel covered with a decorative covering, the rigid base door trim panel being fixed to the inner door panel and being disposed in front of the opening thereof, the rigid base door trim panel locally integrating a cup-shaped housing opened on the decorative covering and covered thereby, and a window lift mechanism partially received within the cup-shaped housing and connected to the rigid base door trim panel, the window lift mechanism comprising a rotative drum for lifting or lowering the window. The rotative drum is rotatively fitted within the cup-shaped housing.

9 Claims, 7 Drawing Sheets

FIG_1

FIG_2

FIG_6

FIG_7

DOOR TRIMMING PANEL HAVING A WINDOW-LIFT MECHANISM

BACKGROUND OF THE INVENTION

The invention relates to the field of manufacturing automotive vehicles and more specifically vehicle doors, together with fittings.

Nowadays, the vehicle doors typically comprise an outer door panel, often made of metal, and an inner trimming panel often provided with decorative covering made of plastic material and/or of a skin surface (leather, fabrics, . . .). Functional elements adapted for providing the vehicle door with all its technical functions are typically interposed (at least partially) between the outer door panel and the inner trimming panel. These functional elements can comprise a window-lift mechanism.

Specifically, in WO-A-94/03341 is disclosed an assembly comprising:

- an outer panel lined with an inner door panel having at least one opening,
- a rigid base door trim panel covered with a decorative covering, the rigid base door trim panel being fixed to the inner door panel and being disposed in front of the opening thereof, the rigid base door trim panel locally integrating a cup-shaped housing having a wall showing an outer convex face protruding towards the vehicle door and an inner concave face, the cup-shaped housing being opened on the decorative covering and covered thereby, and
- a window lift mechanism partially received within the cup-shaped housing and connected to at least one of the rigid base door trim panel and the vehicle door, the window lift mechanism comprising a rotative drum for lifting or lowering the windowshield.

However, the rigid door trim panel typically does not integrate a large enough number of technical functions, what increases the time for fitting up the door assembly, and the number of assembling elements (rivets, clips, . . .). The manufacturing costs are increased and the productive capacity is lowered.

The invention intends to provide a technical solution which at least mitigates, or solves, the above-mentioned drawbacks.

BRIEF SUMMARY OF THE INVENTION

According to one aspect, the assembly of the invention is characterized in that the rotative drum is rotatively fitted within the cup-shaped housing of the rigid base door trim panel.

Another object of the invention is to make the assembling operation easier and increase the reliability and compactness of the assembly.

So, according to another aspect of the invention, the drum is removably fixed to the rigid base door trim panel within the cup-shaped housing, the drum being further connected to driving means fixed to the rigid base door trim panel, the driving means being interposed between the rigid base door trim panel and the decorative covering, and, the fixation between the drum and the rigid base door trim panel is mechanically stronger than the connection between the drum and the driving means, so that the driving means can be separated from the drum, while keeping the drum and the rigid base door trim panel fixed to each other.

Further, the wall of the cup-shaped housing is preferably provided with snapping tongues protruding from the inner concave face of said cup-shaped housing, the snapping tongues being engaged in a groove of the drum for snapping the drum within the cup-shaped housing.

For improving the movement of lifting and lowering the window, while having a smoothly movement thereof, the cup-shaped housing of the rigid base door trim panel portion is provided with channels (or pipes) receiving hollow tubes through which a driving cable is disposed, for lifting or lowering the window, each cable having an end connected to the drum through a passage provided through the wall of the cup-shaped housing.

For having at one and the same time a smooth movement of the window and compensating possible axial deformation of the driving cables, the tubes are interposed between the inner panel and the outer panel of the vehicle door, and said one end of the tubes is provided with spring means for adjusting the position of the tube along the cable disposed therein.

A further object of the invention is to reduce the vibrations of the driving motor used for lifting and lowering the window. Therefore:

- the window lift mechanism preferably comprises a drum connected to driving means fixed to the rigid base door trim panel and interposed between the decorative covering and the rigid base door trim panel,
- said driving means comprises a motor having a driving shaft passing through a central hole of the drum and engaging said drum for rotating it ,and,
- the cup-shaped housing has a central hole within which the driving shaft is engaged for centering said driving shaft.

Furthermore, the invention intends to make the access to the cup-shaped housing and the fitting of the drum easier.

For that purpose, the rigid base door trim panel and the decorative covering are preferably manufactured as two distinct elements made of plastic material and fixed to each other, while keeping therebetween a space receiving a part of the window-lift mechanism.

BRIEF DESCRIPTION OF THE DRAWINGS

Below, a more detailed description of the invention is given.

In the corresponding drawings.

DETAILED DESCRIPTION

Figure 1:
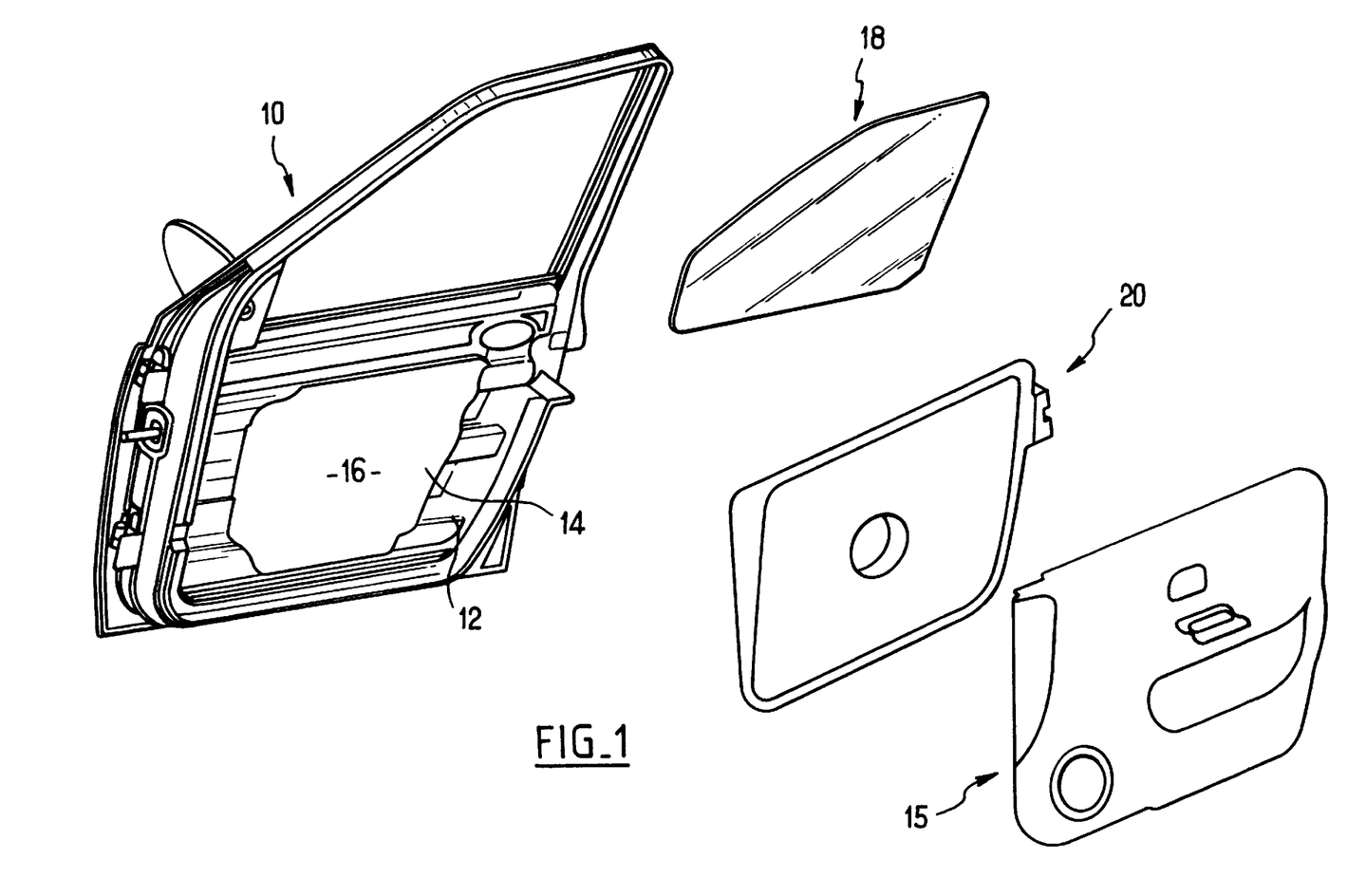
FIG. 1 is a diagrammatic perspective view of a vehicle door.

In FIG. 1, the diagrammatic view shows an assembly (door module) comprising a vehicle door 10 provided with a rigid base door trim panel 20 covered with a decorative covering 15 visible from the inside of the vehicle (passenger compartment).

The decorative covering 15 can typically be made of plastic material covered with a decorative layer (leather, felt . . .).

The vehicle door 10 comprises an external panel (typically a sheet metal, but which can be made of plastic, or a composite material) preferably lined with an inner panel 12 (preferably a sheet metal) having at least one large opening 16 therethrough. The inner 12 and outer panels 14 define a box therebetween. Said box is adapted for receiving a window 18. A window-lift mechanism is provided for lifting or lowering the window.

The door trim panel 20 (preferably made of plastic material) is fixed to the inner panel 12 of the vehicle door 10 by using fixation means, such as clips, rivets, or screws.

The decorative covering 15 is detachably fixed to the vehicle door and/or to the door trim panel, so that it can be removed therefrom with a view to repairing or replacing functional elements thereof, such as elements of the window-lift mechanism.

Figure 2:
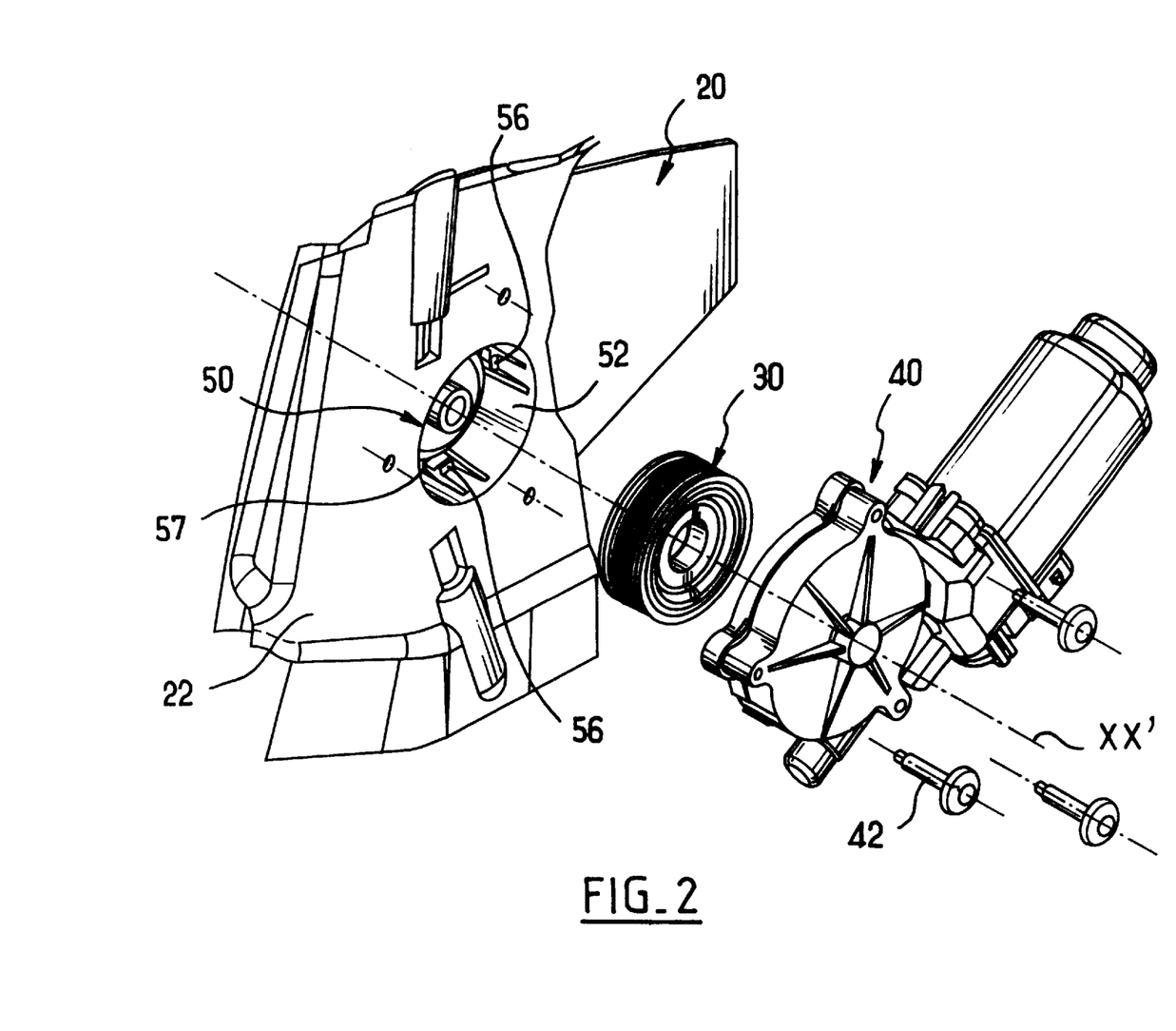
FIG. 2 is a perspective view of a rigid base door panel according to the invention, including some of the functional elements thereof especially some of the components of the window-lift mechanism)

FIG. 2 shows the door trim panel 20 (especially the inner surface 22 thereof), a drum 30 having a circular section and a driving motor 40. The drum 30 and the motor 40 are elements of the window-lift mechanism.

The door trim panel 20 integrates a hollow housing 50 defining a cup-shaped housing of the panel. The cup-shaped housing 50 has an essentially circular section in a plane parallel to the door trim panel. The cup-shaped housing 50 has a peripheral wall 52 having a substantially frustroconical shape. Said cup-shaped housing protrudes from the door trim panel towards the vehicle door (external panel thereof especially through the opening 16) and has a transversal bottom surface 54 (see FIGS. 3 and 4).

Figure 6:
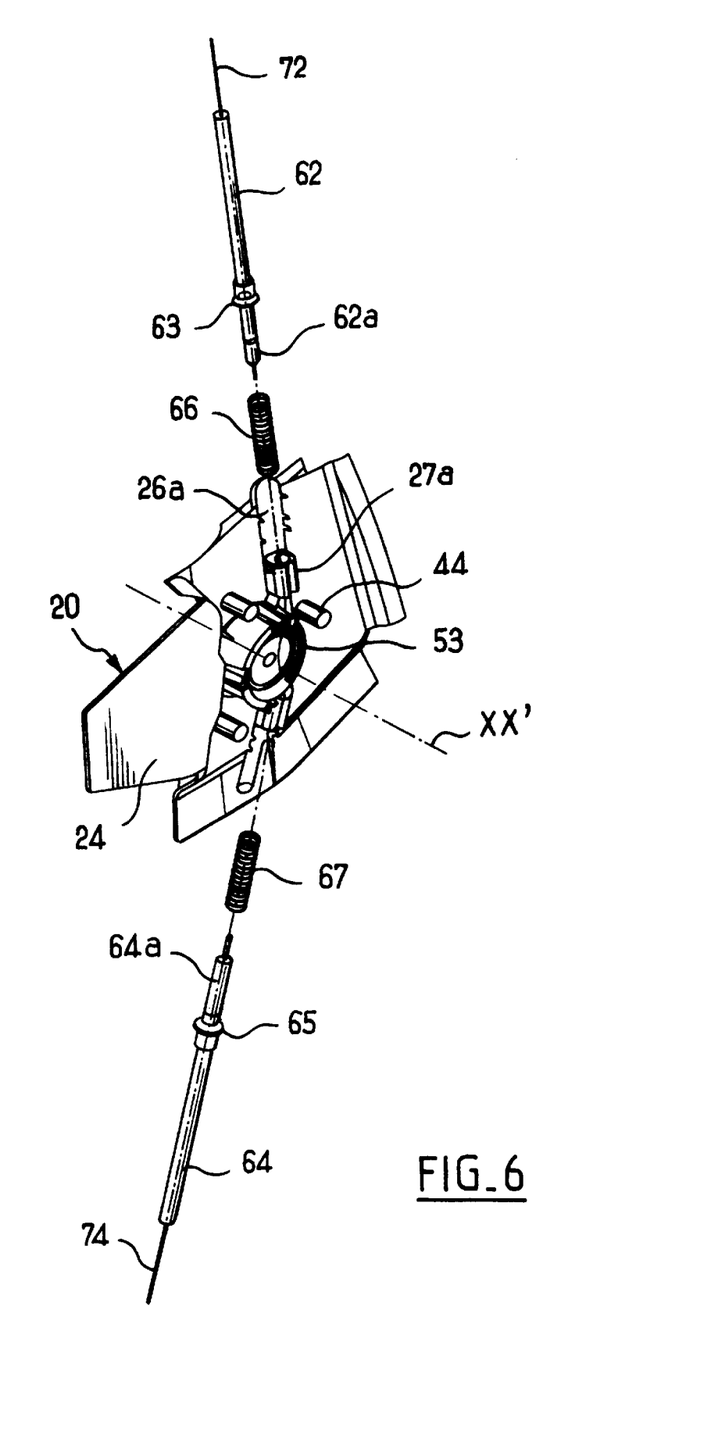
FIG. 6 is a perspective view of the opposed face (outer face) of said rigid base door trim panel, including other elements of the window-lift mechanism.
Figure 7:
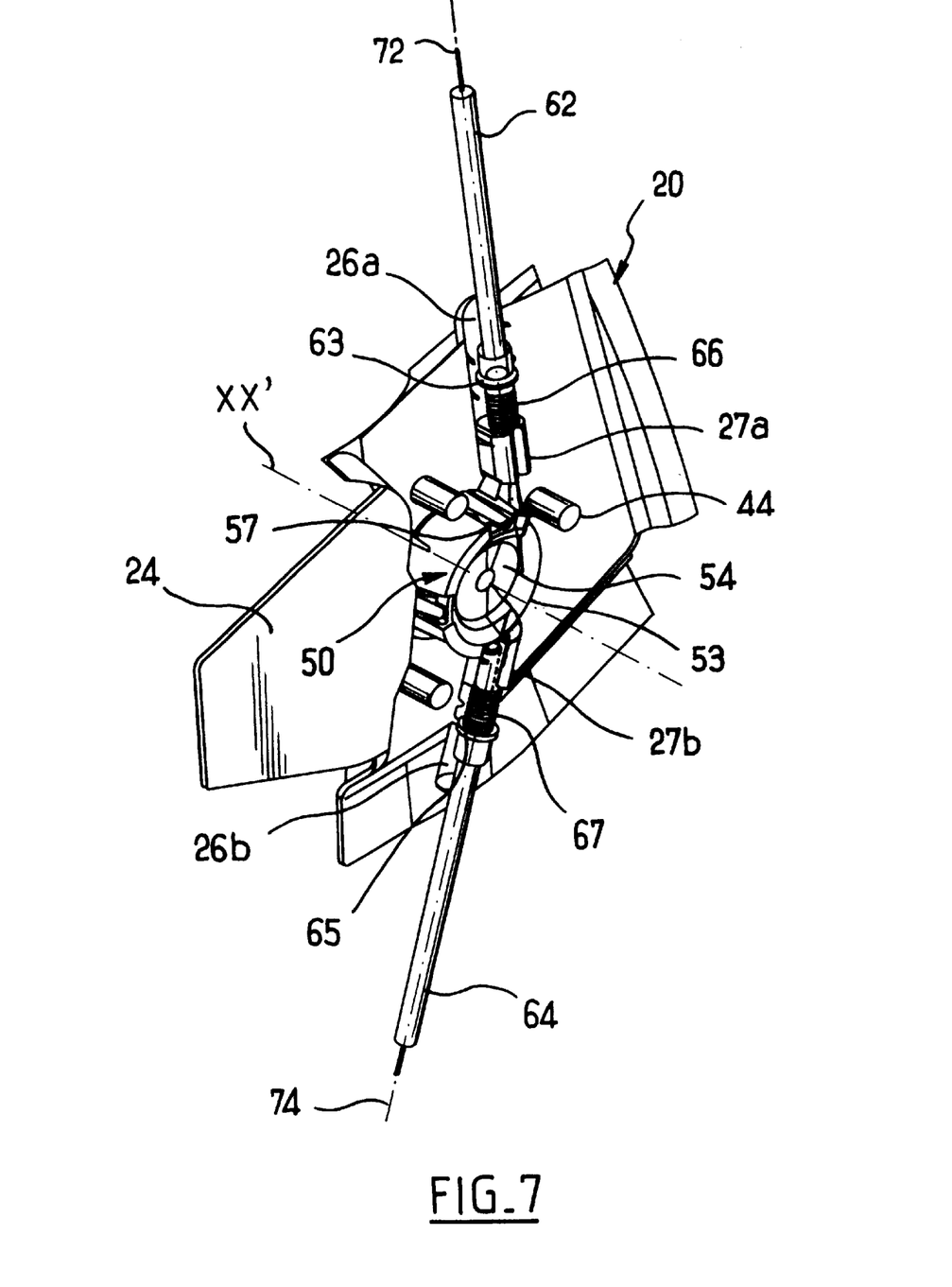
FIG. 7 is a perspective view similar to FIG. 6, including the above-mentioned elements of the window-lift mechanism, as disposed in the operative state.

On its side facing the vehicle door, the bottom surface 54 has a concavity defining an open cavity 53 (see FIGS. 6 and 7).

The circular section of the cup-shaped housing 50 is closely adapted to the section of the drum 30, so that the drum can be fitted within said cup-shaped housing (see FIG. 4) while being adapted to rotate therein round an axis X–X' for lifting or lowering the window 18. Further, the width of the drum (along the axis X–X') is substantially equal to (preferably lightly lower than) the depth of the cup-shaped housing 50, so that the rum is completely engaged (does not extend beyond) below the inner surface 22 of said door trim panel 20.

Figure 3:
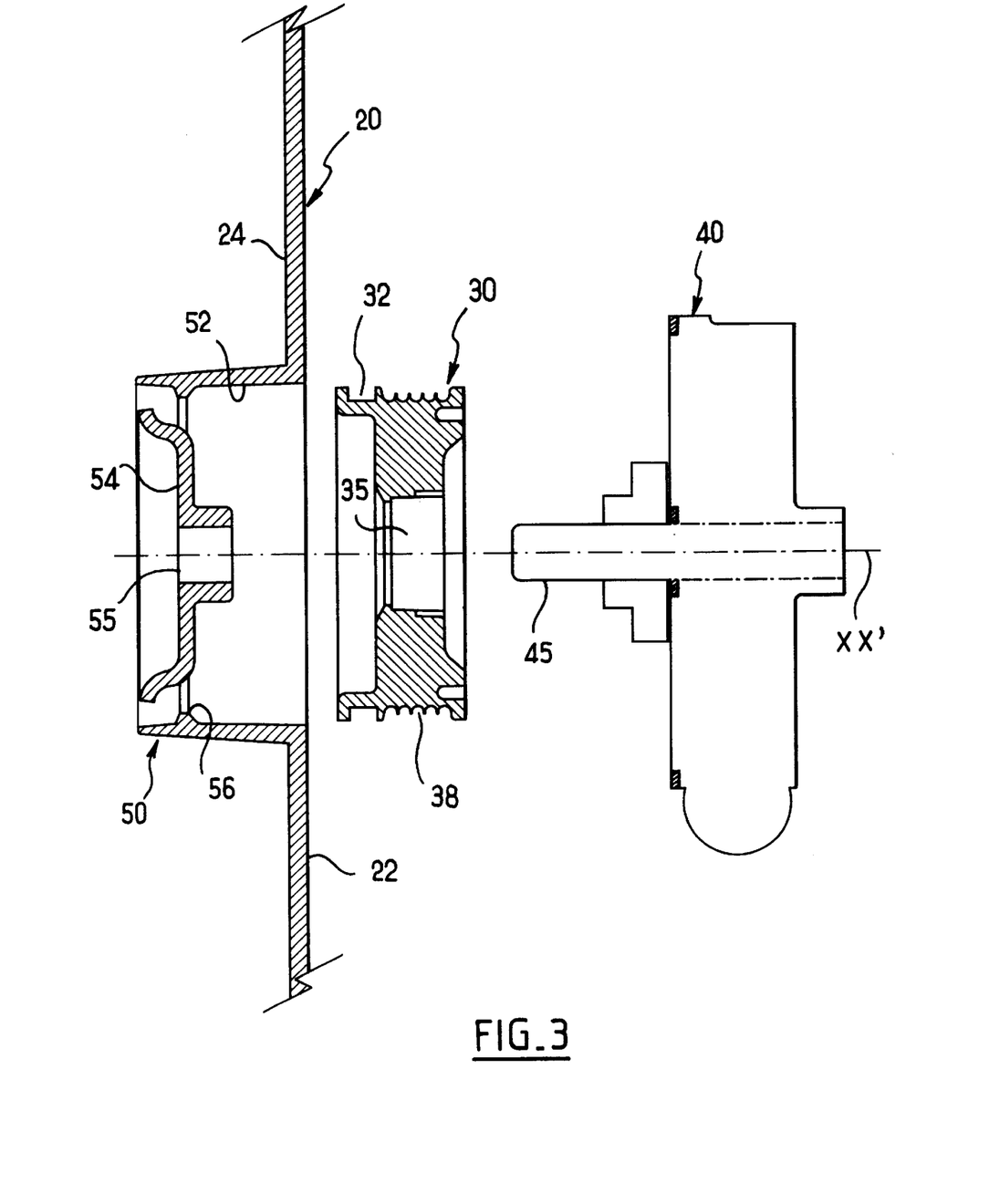
FIG. 3 is a detailed section of FIG. 2.
Figure 4:
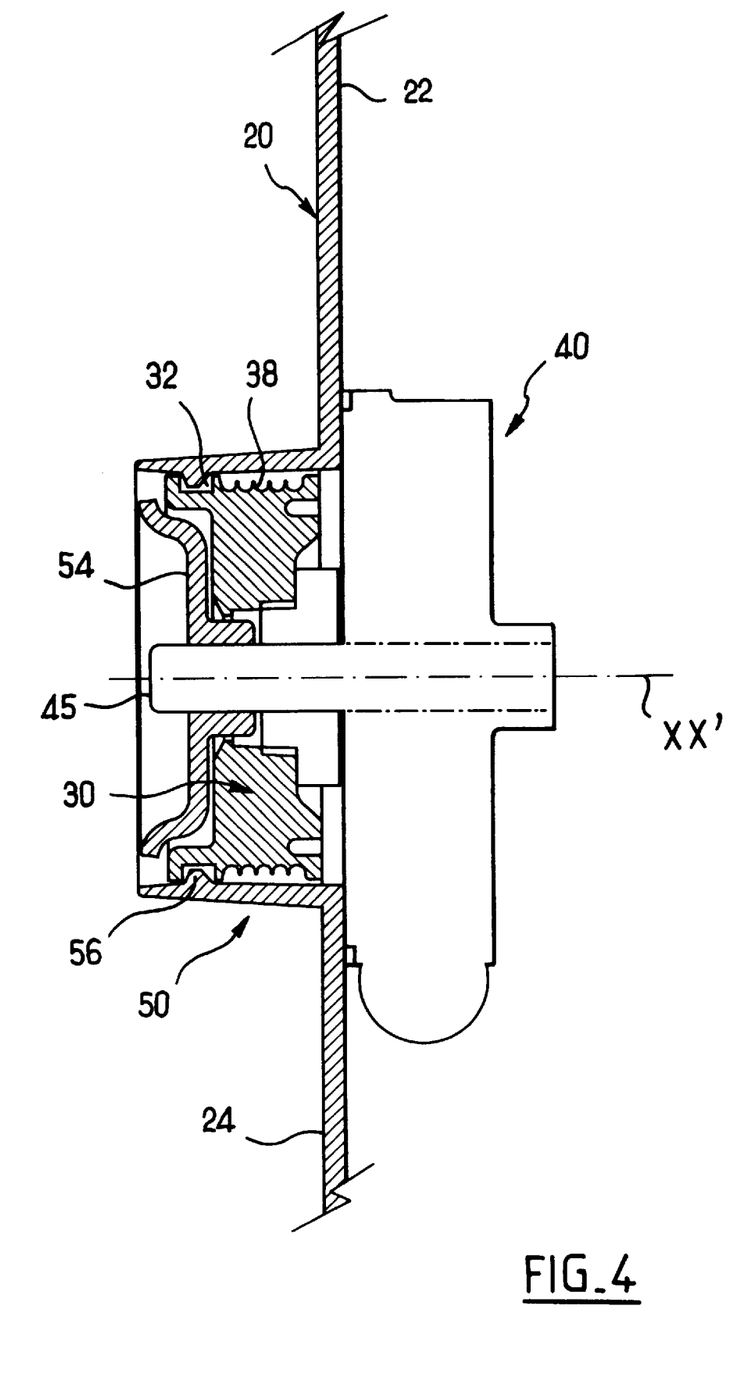
FIG. 4 is a detailed section similar to the section of FIG. 3 (the elements as illustrated are shown in an assembled position, as they operate on the rigid base door trim panel)

As shown in FIGS. 2 to 4, the drum (often called pulley) has an annular groove 32 close to one of its opposed faces. The groove is U-shaped, and cooperates with extensions 56 protruding from the internal peripheral wall 52 of the cup-shaped housing 50 for snapping the drum, and thus axially retaining said drum within the cup-shaped housing 50. The extensions 56 are preferably elastic tongues, or flaps, provided through the peripheral wall 52 of the cup-shaped housing. Reference 57 (FIG. 7) refers to the cut openings defining the elastic tongues 56. The wall 52 can be provided with three snapping tongues regularly disposed therethrough.

Driving means 40 are provided for rotating the drum 30 around the axis X–X'. The driving means can comprise an electric motor 40.

As illustrated, said motor 40 is fixed behind the drum 30, against the inner surface 22 of the door trim panel 20, by using screws 42, for example (see FIG. 2). The motor 40, which is driven from the passenger compartment (for example by using a pushing button disposed on the armrest of the trimmed door) has a driving shaft 45 engaged within the central hole 35 of the drum 30. The driving shaft 45 is further engaged within the central hole 55 of the transverse bottom 54 of the cup-shaped housing 50, for a guiding and centering effect and preventing the driving shaft from vibrating while rotating.

Figure 5:
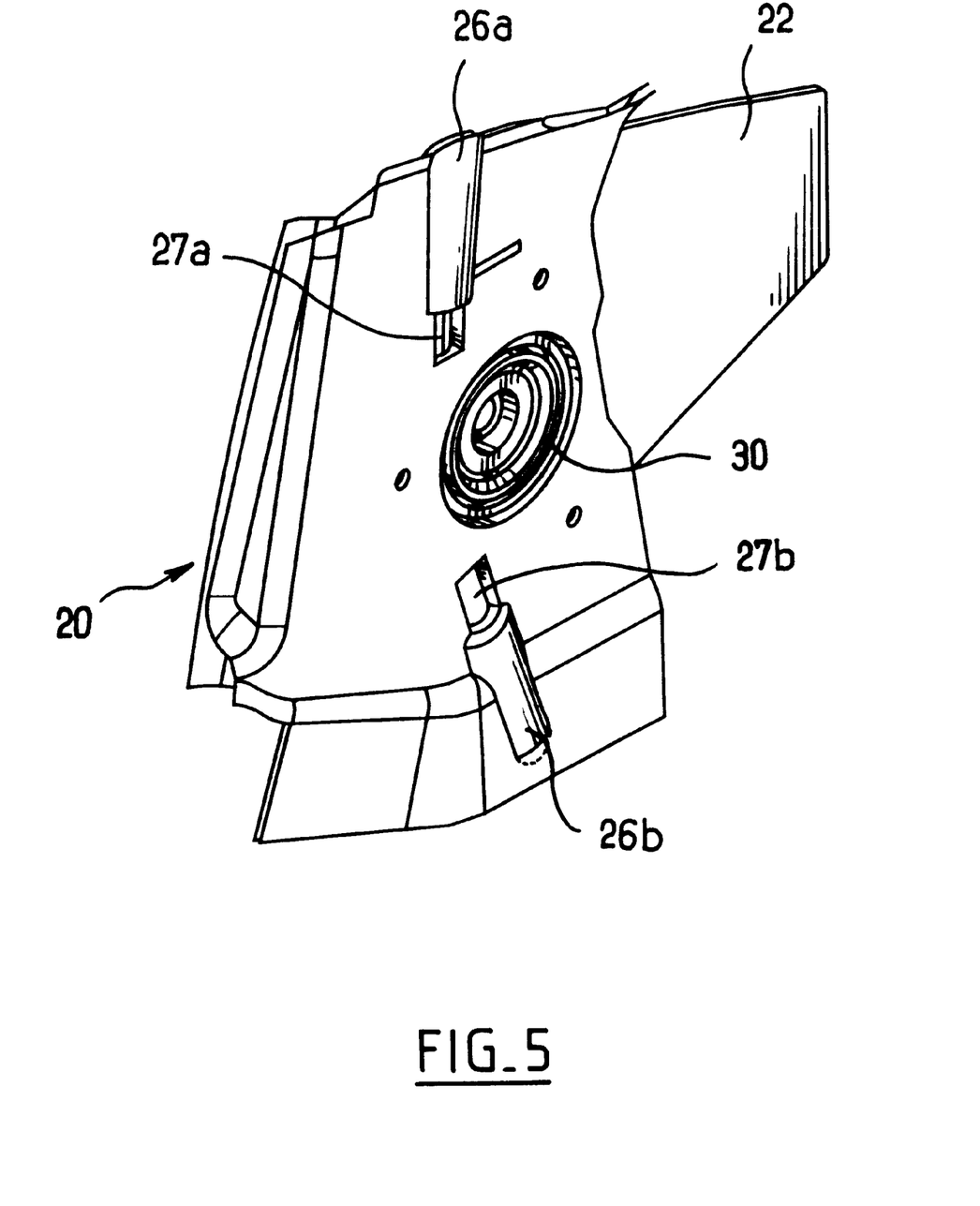
FIG. 5 is a perspective view of a portion of one face (inner face) of the rigid base door trim panel.

FIG. 5 shows the door trim panel 20 provided with the drum 30, just before assembling the driving motor 40. The drum is closely fitted in the cup-shaped housing 50. Preferably, the drum does not protrude out of the cup-shaped housing, for allowing the driving motor to completely close the cup-shaped housing (protection against moisture, notably). Further, it is thus easier to pull the driving motor out. It is also to be noted that the driving motor can be separated from the door trim panel while leaving the drum within the cup-shaped housing 50. To that aim, the fixation between the drum 30 and the elastic tongues 56 is mechanically stronger than the connection between the drum 30 and the driving shaft 45 of the driving means 40.

FIGS. 6 and 7 show the outer surface 24 (also called the damp face) of the rigid base door trim panel, viz. the surface facing the outer panel 14 of the vehicle door 10. Motor fixation means (shown by the excrescence 44) are provided for fixing the driving motor. The excrescences 44 extend beyond the outer surface 24 for allowing screw cuttings to be made in the inner surface thereof.

It is further to be noted that the outer surface 24 comprises pipes 26a, 26b (the back face of which is illustrated in FIG. 5). The pipes have a substantially hemicylindrical section and end in the opened cavity 53 of the cup-shaped housing 50. The first pipe 26a receives a first hollow tube 62 which is substantially vertically disposed. The first hollow tube 62 is erected from the cup-shaped housing 50, whereas the second pipe 26b receives a second hollow tube 64 extending downwards from the cup-shaped housing. The tubes 62 and 64 are axially sliding in rings 27a and 27b (the back of which is shown in FIG. 5). The rings 27a, 27b are integrated (molded) with the rigid base door trim panel and are essentially interposed between the pipes 26a, 26b and the peripheral wall 52 of the cup-shaped housing 50. The tubes 62, 64 are provided, at their respective ends 62a, 64a (which are closer to the cup-shaped housing), with a spring 66, 67 interposed between the corresponding ring 27a, 27b and a corresponding shoulder 63, 65 of the tubes.

A cable 72, 74 is disposed in each hollow tube 62, 64. The cables can be made of metal or NYLON®, for example. A free end portion of each cable passes through the open cavity 53 of the cup-shaped housing 50 (see FIG. 6) and the end of the corresponding cable is fixed to the drum 30 by means of a connector crimped on said cable and inserted within a portion of the drum.

The other end of each cable is indirectly connected to the window through connectors (not illustrated) such as a runner sliding in a groove. Each cable 72, 74 is further partially disposed round the drum 30, into the peripheral groove 38 (see FIGS. 3 and 4). One cable is wound clockwise, whereas the other cable is wound counterclockwise, so that when the drum is rotated in one direction, the first cable is rolled whereas the other cable is unrolled, for lifting or lowering the window as a function of the rotating direction. The cables can be provided with straining pulleys (not illustrated). The cables 72, 74 can have their tension modified and thus a variable length (a few millimeters in excess, for example). So, the springs 66, 67, together with the sliding fitting of the tubes 62, 64 into the rings 27a, 27b, for absorbing the variations in length of the cables, allow the window to be smoothly moved.

As the tubes 62, 64 are disposed in the possibly wet (damp) section of the door module, watertight seals (not illustrated) will preferably be provided at each end of the tubes, within said tubes, for preventing water to enter the tubes. For the same reasons, the cables and the springs will be protected against moisture and water, or will be made of a plastic material.

The drum 30 is preferably made of plastic material, for sake of strength and watertightness. Especially, NYLON® including glass fibers (for example 30% of fibers) can be used.

In case of failure, it is very easy to disconnect and withdraw the driving motor by withdrawing the covering from the rigid base door trim panel and unscrewing the screws fixing the driving motor to the trim door panel, without withdrawing the drum which must stay as fitted, with the cables engaged (except if said cables have to be withdrawn or repaired).

The invention is not limited to the embodiments above described and illustrated.

For example, a manual driving system can be put in place of the electrical motor (for example a handle adapted to be operated from the passenger compartment and which would be extended by a shaft engaged into the central hole of the drum).

Further, the rigid base door trim panel and the decorative covering can be integrated in only one piece molded in a plastic material, as is more and more required by the car manufacturers.

What is claimed is:

1. A vehicle door comprising:
   (a) an outer panel lined with an inner door panel having at least one opening therethrough,
   (b) a rigid base door trim panel covered with a decorative covering, the rigid base door trim panel being fixed to the inner door panel and being disposed in front of the opening thereof, the rigid base door trim panel locally integrating a cup-shaped housing having a wall showing an outer convex face protruding towards the vehicle door and an inner concave face, the cup-shaped housing being opened towards the decorative covering and covered thereby, and
   (c) a window lift mechanism partially received within the cup-shaped housing and connected to the rigid base door trim panel, the window lift mechanism comprising a rotative drum for lifting or lowering the window,
      (i) wherein the rotative drum is rotatively fitted within the cup-shaped housing.

2. The vehicle door according to claim 1, wherein the outer convex face of the cup-shaped housing is provided with pipes receiving hollow tubes through which a driving cable is disposed, for lifting or lowering the window, each cable having an end connected to the drum through a passage provided through the wall of the cup-shaped housing.

3. The vehicle door according to claim 2, wherein the tubes are interposed between the inner panel and the outer panel of the vehicle door, the end of the tubes being provided with spring means for adjusting the position of the tube along the cable disposed therein.

4. A rigid base door trim panel for a vehicle door comprising an inner door panel, the rigid base door trim panel being covered with a decorative covering, and being adapted to be fixed to the inner door panel, the rigid base door trim panel locally integrating a cup-shaped housing having a wall having an outer, protruding convex face and an inner concave face, the cup-shaped housing being opened towards the decorative covering and covered thereby, the rigid base door trim panel being provided with a window lift mechanism partially received within the cup-shaped housing, said window lift mechanism being adapted to be connected to the rigid base door trim panel, the window lift mechanism comprising a rotative drum for lifting or lowering the window, wherein the rotative drum is rotatively fitted within the cup-shaped housing.

5. The trim panel according to claim 4, wherein:
   (a) the drum is removably fixed to the rigid base door trim panel, within the cup-shaped housing,
      (i) the drum is connected to driving means fixed to the rigid base door trim panel, the driving means being interposed between the rigid base door trim panel and the decorative covering, and
      (ii) the fixation between the drum and the rigid base door trim panel is mechanically stronger than the connection between the drum and the driving means, so that the driving means can be separated from the drum, while keeping the drum and the rigid base door trim panel fixed to each other.

6. The trim panel according to claim 4, wherein the wall of the cup-shaped housing is provided with snapping tongues protruding from the inner concave face of said cup-shaped housing, the snapping tongues being engaged in a groove of the drum for snapping the drum within the cup-shaped housing.

7. The trim panel according to claim 4, wherein the outer convex face of the cup-shaped housing is provided with pipes receiving hollow tubes through which a driving cable is disposed, for lifting or lowering the window, each cable having an end connected to the drum through a passage provided through the wall of the cup-shaped housing.

8. The trim panel according to claim 4, wherein:
   (a) the drum is connected to driving means fixed to the rigid base door trim panel and interposed between the decorative covering and the rigid base door trim panel,
   (b) the driving means comprises a motor having a driving shaft passing through a central hole of the drum, and engaging said drum for rotating it, and
   (c) the cup-shaped housing has a central hole within which the driving shaft is engaged for centering said driving shaft.

9. The trim panel according to claim 4, wherein the rigid base door trim panel and the decorative covering are distinct elements fixed to each other while keeping therebetween a space receiving a part of the window-lift mechanism.

* * * * *

UNITED STATES PATENT AND TRADEMARK OFFICE
CERTIFICATE OF CORRECTION

PATENT NO. : 6,305,129 B1  Page 1 of 1
DATED : October 23, 2001
INVENTOR(S) : Bernhard Yves Eckhardt et al.

It is certified that error appears in the above-identified patent and that said Letters Patent is hereby corrected as shown below:

<u>Title page,</u>
Item [73], add the following: -- SAI Automotive SAL GMBH --

Signed and Sealed this

Twenty-fourth Day of September, 2002

Attest:

Attesting Officer

JAMES E. ROGAN
*Director of the United States Patent and Trademark Office*